United States Patent
Iizuka et al.

(10) Patent No.: US 8,372,911 B2
(45) Date of Patent: Feb. 12, 2013

(54) GOLF BALL MATERIAL AND METHOD OF PREPARING THE SAME

(75) Inventors: Kae Iizuka, Saitamaken (JP); Eiji Takehana, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 34 days.

(21) Appl. No.: 13/178,822

(22) Filed: Jul. 8, 2011

(65) Prior Publication Data

US 2012/0029130 A1 Feb. 2, 2012

Related U.S. Application Data

(63) Continuation-in-part of application No. 12/843,966, filed on Jul. 27, 2010, now Pat. No. 8,008,392.

(51) Int. Cl.
- *C08K 5/098* (2006.01)
- *C08L 33/00* (2006.01)
- *C08L 23/06* (2006.01)
- *A63B 37/00* (2006.01)

(52) U.S. Cl. ........ 524/522; 524/284; 524/401; 524/523; 524/528; 524/539; 524/556; 524/562; 473/351

(58) Field of Classification Search .................. 524/284, 524/401, 522, 523, 528, 539, 556, 562
See application file for complete search history.

(56) References Cited

U.S. PATENT DOCUMENTS

| | | | |
|---|---|---|---|
| 5,222,733 A | 6/1993 | Brunty | |
| 5,873,796 A | 2/1999 | Cavallaro et al. | |
| 6,267,693 B1 | 7/2001 | Sullivan | |
| 7,273,903 B2 | 9/2007 | Chen | |
| 7,332,533 B2 * | 2/2008 | Kim et al. | 523/216 |
| 7,462,113 B2 | 12/2008 | Kim et al. | |
| 7,510,488 B2 * | 3/2009 | Higuchi et al. | 473/373 |

* cited by examiner

*Primary Examiner* — Kelechi Egwim
(74) *Attorney, Agent, or Firm* — Sughrue Mion, PLLC

(57) ABSTRACT

The invention provides a golf ball material which is a resin mixture composed of (a) a nonionic olefin-unsaturated carboxylic acid copolymer and/or olefin-unsaturated carboxylic acid-unsaturated carboxylic acid ester copolymer, (b) a non-ionic olefin-unsaturated carboxylic acid copolymer and/or olefin-unsaturated carboxylic acid-unsaturated carboxylic acid ester copolymer, (c) an organic acid or a metal salt thereof, (d) a basic inorganic metal compound for neutralizing at least 70 mol % of acid groups in components (a) to (c), and (e) a spherical inorganic filler, which resin mixture has a Shore D hardness of from 40 to 60. The golf ball material of the invention provides an excellent rebound resilience and durability while maintaining the flow properties essential for injection molding.

10 Claims, No Drawings

US 8,372,911 B2

GOLF BALL MATERIAL AND METHOD OF PREPARING THE SAME

CROSS-REFERENCE TO RELATED APPLICATION

This application is a continuation-in-part of application Ser. No. 12/843,966 filed on Jul. 27, 2010, now U.S. Pat. No. 8,008,392 the contents of which are hereby incorporated by reference.

BACKGROUND OF THE INVENTION

The present invention relates to a golf ball material which is highly suitable for use as a cover material in golf balls, especially a golf ball material for use as an inner cover material in multi-piece solid golf balls composed of a core and a cover of two or more layers encasing the core. The invention also relates to a method of preparing such a golf ball material.

Ionic resins, or ionomers, are conventionally used in golf balls. To impart the ball with a higher rebound or a lower spin rate in particular, the desired effect is more readily achieved when the ionic resin has a higher acid content. Art for imparting the ball with a higher rebound or a lower spin rate by highly neutralizing the ionic resin has also been disclosed. Examples of such methods that are being practiced include methods which involve blending ionomers together, methods in which other thermoplastic resins and/or additives are blended together with an ionomer, and methods which increase the degree of neutralization of an ionomer itself.

Among methods that involve blending ionomers together, a number of techniques which use in combination two ionomers of differing weight-average molecular weights have been proposed. For example, U.S. Pat. No. 7,462,113 discloses the use in a cover material of a ternary ionomer having a weight-average molecular weight of from 80,000 to 500,000 in combination with a ternary ionomer having a weight-average molecular weight of from 2,000 to 30,000. Also, U.S. Pat. No. 7,273,903 describes blending together, as a cover material: a ternary ionomer having a weight-average molecular weight of from 80,000 to 500,000, a binary ionomer having a weight-average molecular weight of from 2,000 to 30,000, and an optional thermoplastic elastomer.

Golf ball materials which use ionomers and blends wherein the content of unsaturated carboxylic acid (sometimes abbreviated below as "acid content") falls in a specific range have also been disclosed. For example, U.S. Pat. No. 6,267,693 describes an ionomer blend having an acid content of from 18.5 to 21.5%, and U.S. Pat. No. 5,873,796 describes a blend of an ionomer having an acid content of 19% with an ionomer having an acid content of 15%. Also, U.S. Pat. No. 5,222,733 describes a golf ball composition wherein at least 30% of the composition is an ionomer having an acid content of from 20 to 30%.

However, when an ionic resin having a high acid content is highly neutralized, the durability declines. For this reason, such ionic resins are not actively used in golf balls. Also, ionic resins with a high acid content often have too low a melt flow index (MI), making them difficult to injection mold, which has sometimes resulted in a poor workability when manufacturing golf balls.

In addition, art which attempts to increase the durability by using inorganic fillers and the like has been proposed. However, due to the combination of the shape of the inorganic filler and the molding method, inorganic filler-induced orientation arises, making it impossible to achieve the desired effect.

SUMMARY OF THE INVENTION

It is therefore an object of the present invention to provide a golf ball material which, owing to the use of a spherical inorganic filler and a nonionic polymer having a high acid content, has an excellent rebound resilience and an excellent durability while maintaining the flow properties essential for injection molding. Another object of the invention is to provide a method of preparing such a golf ball material.

As a result of extensive investigations, the inventors have discovered that it is possible to achieve a golf ball material which, by blending a nonionic polymer having a high acid content with a nonionic polymer having a low or moderate acid content and neutralizing the acid content within a specific range, has an even higher rebound and an even lower spin rate while maintaining a good moldability, and moreover which, by additionally using a spherical inorganic filler, also has an excellent durability.

Accordingly, the present invention provides the following golf ball material and method of preparation.

[1] A golf ball material which is a resin mixture comprising:
(a) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 2.5 to 10.0 and an unsaturated carboxylic acid content of at least 16 wt %,
(b) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of 15 wt % or less,
(c) an organic acid or a metal salt thereof,
(d) a basic inorganic metal compound for neutralizing at least 70 mol % of acid groups in components (a) to (c), and
(e) a spherical inorganic filler;
wherein the resin mixture has a Shore D hardness of from 40 to 60, has a mixing ratio by weight (a):(b) between component (a) and component (b) of from 20:80 to 80:20, includes component (c) in an amount of from 30 to 80 parts by weight per 100 parts by weight of components (a) and (b) combined, and includes component (e) in an amount of from 0.01 to 20 parts by weight per 100 parts by weight of components (a) and (b) combined.

[2] The golf ball material of [1], wherein component (e) includes silicon dioxide.

[3] The golf ball material of [1], wherein the spherical inorganic filler (e) has a sphericity (ratio of maximum particle length/minimum particle width) of from 1.00 to 2.00.

[4] The golf ball material of [1], wherein the spherical inorganic filler (e) is composed of a glass material.

[5] The golf ball material of [1], wherein the glass material is selected from the group consisting of NaO—CaO—SiO$_2$ glasses, Al$_2$O$_3$—B$_2$O$_3$—SiO$_2$ glasses and CaO—Al$_2$O$_3$—SiO$_2$ glasses.

[6] The golf ball material of [5], wherein the glass material has the following oxide equivalent composition.
(i) when a NaO—CaO—SiO$_2$ glass is used, the oxide equivalent composition is 0.5 to 45 wt % of NaO, 0.5 to 45 wt % of CaO, and 40 to 90 wt % of SiO$_2$;

(ii) when an $Al_2O_3$—$B_2O_3$—$SiO_2$ glass is used, the oxide equivalent composition is 0.5 to 40 wt % of $Al_2O_3$, 0.5 to 40 wt of $B_2O_3$, and 40 to 90 wt % of $SiO_2$;

(iii) when a CaO—$Al_2O_3$—$SiO_2$ glass is used, the oxide equivalent composition is 0.5 to 45 wt % of CaO, 0.5 to 40 wt % of $Al_2O_3$, and 40 to 90 wt % of $SiO_2$.

[7] The golf ball material of [1], wherein the spherical inorganic filler (e) has an average particle size of from 0.1 to 1,000 μm.

[8] The golf ball material of [1], wherein the organic acid of component (c) is stearic acid or a metal salt thereof.

[9] The golf ball material of [1], wherein the unsaturated carboxylic acid included in components (a) and (b) is acrylic acid or methacrylic acid.

[10] A method of preparing a golf ball material, comprising the step of preparing the golf ball material of [1] using a single-screw extruder, a twin-screw extruder, or a tandem extruder thereof.

DETAILED DESCRIPTION OF THE INVENTION

The invention is described more fully below.

The golf ball material of the invention contains as the base resins: (a) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 2.5 to 10.0 and an unsaturated carboxylic acid content of at least 16 wt %, and (b) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of 15 wt % or less.

The weight-average molecular weight (Mw) of component (a) is from 40,000 to 200,000, and preferably from 40,000 to 150,000. The weight-average molecular weight (Mw)/number-average molecular weight (Mn) ratio is from 2.5 to 10.0, and preferably from 2.7 to 6.5.

The weight-average molecular weight (Mw) of component (b) is from 40,000 to 200,000, and preferably from 50,000 to 190,000. The weight-average molecular weight (Mw)/number-average molecular weight (Mn) ratio is from 4.0 to 10.0, and preferably from 4.0 to 9.5.

The weight-average molecular weight (Mw) and the number-average molecular weight (Mn) are values calculated relative to polystyrene in gel permeation chromatography (GPC). A word of explanation is needed here concerning GPC molecular weight measurement. It is not possible to directly take GPC measurements for binary copolymers and ternary copolymers because these molecules are adsorbed to the GPC column owing to the unsaturated carboxylic acid groups within the molecule. Instead, the unsaturated carboxylic acid groups are generally converted to esters, following which GPC measurement is carried out and the polystyrene-equivalent average molecular weights Mw and Mn are calculated.

The olefin used in above component (a) or (b) preferably has from 2 to 6 carbons, and is most preferably ethylene. The unsaturated carboxylic acid used in component (a) or (b) is exemplified by acrylic acid (AA) and methacrylic acid (MAA), although the use of methacrylic acid (MAA) is especially preferred. From the standpoint of obtaining a suitable rebound and hardness, the unsaturated carboxylic acid ester used in component (a) or (b) is preferably an alkyl ester, and more preferably a lower alkyl ester having from 1 to 8 carbons. The use of butyl acrylate (n-butyl acrylate, i-butyl acrylate) is most preferred.

The unsaturated carboxylic acid content (acid content) in component (a) is at least 16 wt %, preferably from 16 to 25 wt %, more preferably from 16 to 23 wt %, and even more preferably from 16 to 20 wt %. At a low acid content, moldings of the golf ball material may be unable to achieve a good rebound.

The unsaturated carboxylic acid content (acid content) in component (b) is not more than 15 wt %, preferably from 2 to 15 wt %, more preferably from 5 to 15 wt %, and even more preferably from 7 to 15 wt %. At a high acid content, the durability may worsen.

In this invention, it is essential to use component (a) and component (b) together. The mixing ratio by weight of component (a) to component (b), or (a):(b), is preferably from 20:80 to 80:20, and more preferably from 30:70 to 70:30. If the proportion of component (a) is smaller than the above range, a sufficient ball rebound may not be achieved. On the other hand, if the proportion of component (a) is higher than the above range, the ball durability may worsen.

As mentioned above, nonionic high acid-content polymers having a weight-average molecular weight (Mw) and a molecular weight distribution breadth (U=Mw/Mn) set within specific ranges are used as components (a) and (b). For example, use may be made of commercial products from the Nucrel series (produced by DuPont-Mitsui Polychemicals Co., Ltd.) or the Escor series (produced by ExxonMobil Chemical).

The organic acid or metal salt thereof serving as component (c), while not subject to any particular limitation, is preferably one or more selected from the group consisting of stearic acid, behenic acid, oleic acid, maleic acid and metal salts thereof. One selected from the group consisting of stearic acid, oleic acid and mixtures thereof is especially preferred. The organic acid metal salt of component (c) is preferably a metallic soap. The metal salt makes use of metal ions having a valence of from 1 to 3 which are preferably selected from the group consisting of lithium, sodium, magnesium, aluminum, potassium, calcium and zinc. A metal salt of stearic acid is especially preferred. Specifically, the use of magnesium stearate, calcium stearate, zinc stearate or sodium stearate is preferred. Of these, the use of magnesium stearate is especially preferred.

Component (c) is included in an amount, per 100 parts by weight of components (a) and (b) as the base resins, of preferably from 30 to 80 parts by weight, and more preferably from 40 to 80 parts by weight. When component (c) is included in too small an amount, it is difficult to ensure that the resin composition has sufficient flow properties. On the other hand, including too much component (c) may worsen the durability of the golf ball.

Illustrative examples of the metal ions in the basic inorganic metal compound of above component (d) include $Na^+$, $K^+$, $Li^+$, $Zn^{2+}$, $Ca^{2+}$, $Mg^{2+}$, $Cu^{2+}$ and $Co^{2+}$. Of these, $Na^+$, $Zn^{2+}$, $Ca^{2+}$ and $Mg^{2+}$ are preferred, and $Mg^{2+}$ is especially preferred. These metal salts may be introduced into the resin using, for example, formates, acetates, nitrates, carbonates, bicarbonates, oxides or hydroxides.

The basic inorganic metal compound (d) is a component for neutralizing acid groups in above components (a) to (c). The amount of component (d) included is set to at least 70 mol %, based on the acid groups in above components (a) to (c). Here, the amount in which the basic inorganic metal compound serving as component (d) is included may be selected as appropriate for obtaining the desired degree of neutralization. Although this amount also depends on the degree of neutralization of components (a) and (b) that are used, in general it is preferably from 0.5 to 10 parts by weight, and more preferably from 1 to 5 parts by weight, per 100 parts by weight of components (a) and (b) combined.

The degree of neutralization of acid groups in above components (a) to (c) must be at least 70 mol %, and is preferably at least 75 mol %, and more preferably at least 80 mol %. The upper limit is preferably not more than 120 mol %, more preferably not more than 110 mol %, and even more preferably not more than 100 mol %. If the above numerical range is not satisfied, the ball durability may be inferior and a high rebound may not be achieved. On the other hand, if the degree of neutralization is too high, a suitably soft material hardness will be difficult to achieve and the moldability during injection molding may worsen.

The spherical inorganic filler serving as component (e) of the invention, although not subject to any particular limitation, is exemplified by spherical fine particles which have a core-shell structure composed of a core layer covered by a shell layer. In this case, the shell layer may be made of a material such as metal or glass; the use of glass is especially preferred. The core layer may be made of metal, glass, rubber, resin, gel, liquid or the like. By employing such a structure, the spherical inorganic filler is prevented from agglomerating, thus enabling compatibility in the resin material serving as the base to be increased. The fine particles have preferably been subjected to surface treatment or the like.

An example of such surface treatment is surface modification with a silane coupling agent, particularly one having at least one type of functional group selected from among mercapto groups, amino groups and epoxy groups. One or more hitherto used silane coupling agent, or a mixture thereof, may be employed.

In cases where a glass material is employed as the spherical inorganic filler (e), selection from the group consisting of $NaO$—$CaO$—$SiO_2$ glasses, $Al_2O_3$—$B_2O_3$—$SiO_2$ glasses and $CaO$—$Al_2O_3$—$SiO_2$ glasses is preferred. Moreover, it is desirable for the glass material used to be any one of (i) to (iii) below having the indicated compositions:

(i) when a $NaO$—$CaO$—$SiO_2$ glass is used, the oxide equivalent composition is 0.5 to 45 wt % of NaO, 0.5 to 45 wt % of CaO, and 40 to 90 wt % of $SiO_2$;

(ii) when a $Al_2O_3$—$B_2O_3$—$SiO_2$ glass is used, the oxide equivalent composition is 0.5 to 40 wt % of $Al_2O_3$, 0.5 to 40 wt % of $B_2O_3$, and 40 to 90 wt % of $SiO_2$;

(iii) when a $CaO$—$Al_2O_3$—$SiO_2$ glass is used, the oxide equivalent composition is 0.5 to 45 wt % of CaO, 0.5 to 40 wt % of $Al_2O_3$, and 40 to 90 wt % of $SiO_2$.

When the above glass material is not used, compatibility with the base resin may worsen, and it may not be possible to ensure a sufficient durability. Various colorants and other additives may be formulated with the glass material. In addition, it is possible to include also soda in order to lower the melting point.

The spherical inorganic filler has a spherical shape. Common inorganic fillers have various shapes, including irregular shapes, flake-like shapes and needle-like shapes. When the golf ball is molded by an injection molding process or the like, such shapes give rise to an orientation, which may make the ball performance unstable and lead in particular to a decline in the durability.

The spherical inorganic filler (e) has a sphericity (ratio of maximum particle length/minimum particle width) in a range of from 1.00 to 2.00, preferably from 1.00 to 1.50, and more preferably from 1.00 to 1.30. The numerical value of the sphericity is a value measured by scanning electron microscopy (enlargement, 10,000×; n=100). At a value greater than the above range in the sphericity (maximum particle length/minimum particle width), the particle shape enters what is regarded as the "amorphous" region, and the flight performance of the ball may, as in the conventional art, fail to improve.

The spherical inorganic filler (e) used in the invention has a thermal expansion coefficient, as measured at 100° C. for 5 hours, of 2.0% or less, preferably 1.5% or less, and more preferably 1.0% or less. When a polymer material containing a spherical inorganic filler is molded, if an inorganic filler having a thermal expansion coefficient larger than the above range is used, gaps arise between the polymer material and the spherical inorganic filler, as a result of which energy transfer at the interior of the ball when the ball is struck fails to proceed effectively; instead, that energy is consumed as energy which causes separation or cracking at such interfacial gaps, as a result of which the flight performance may not improve. As used herein, "thermal expansion coefficient" denotes the thermal expansion coefficient of the spherical inorganic filler material and refers to the measured value obtained in general accordance with JIS-R1618.

The average particle size of the spherical inorganic filler (e), although not subject to any particular limitation, is preferably from 0.1 to 1,000 μm, more preferably from 1 to 750 μm, and even more preferably from 25 to 500 μm. Moreover, the spherical inorganic filler preferably has some degree of particle size distribution, typically in a range of ±90% of the average particle size, more preferably in a range of ±70% of the average particle size, and even more preferably in a range of ±50% of the average particle size. If the average particle size is smaller than the above range, the amount of component (e) added must be further increased to achieve a reinforcing effect. However, as a result, the resin specific gravity becomes higher, which may hinder the degree of freedom in the ball design. On the other hand, if the average particle size is larger than the above range, the durability may decrease.

The spherical inorganic filler (e) is included in an amount, per 100 parts by weight of the base resins serving as components (a) and (b), of from 0.01 to 20 parts by weight, and preferably from 0.1 to 18 parts by weight. At a component (e) content below 0.1 part by weight, sufficient reinforcing effect cannot be obtained. On the other hand, a component (e) content of more than 20 parts by weight may lead to a decline in the durability.

The resin composition made up of above components (a) to (e) accounts for at least about 50 wt %, preferably at least about 60 wt %, more preferably at least about 70 wt %, and most preferably at least about 90 wt %, of the overall golf ball material.

The following thermoplastic resins may be included in the golf ball material of the invention, insofar as the objects of the invention are attainable. Illustrative, non-limiting, examples of thermoplastic resins that may be used include ionomer resins, polyolefin elastomers (including polyolefins and metallocene polyolefins), polystyrene elastomers, diene polymers, polyacrylate polymers, polyamide elastomers, polyurethane elastomers, polyester elastomers and polyacetals.

In addition, the golf ball material of the invention may also include optional additives as appropriate for the intended use. For example, when the inventive golf ball material is to be used as a cover material, various additives such as pigments, dispersants, antioxidants, ultraviolet absorbers and light stabilizers may be added to above components (a) to (e). When such additives are included, they may be added in an amount of generally at least 0.1 part by weight, and preferably at least 0.5 part by weight, but generally not more than 10 parts by weight, and preferably not more than 4 parts by weight, per 100 parts by weight of above components (a) to (e) combined.

The melt index (MI) of the inventive golf ball material, as measured in accordance with JIS-K7210 at a test temperature of 190° C. and under a test load of 21.18 N (2.16 kgf), is not subject to any particular limitation. However, to provide good flow properties and moldability at the time of injection molding, it is recommended that the melt flow rate be preferably at least 1.0 g/10 min, more preferably at least 2.0 g/10 min, and even more preferably at least 3.0 g/10 min, but preferably not more than 20.0 g/10 min, more preferably not more than about 15.0 g/10 min, and even more preferably not more than 10.0 g/10 min.

In order to achieve a suitably soft hardness, moldings obtained using the golf ball material of the invention have a hardness, expressed as the Shore D hardness, of at least 40, preferably at least 45, and more preferably at least 50. The upper limit is not more than 70.

The method of preparing the golf ball material of the present invention is not subject to any particular limitation, although use may be made of a method which involves charging the polymers serving as components (a) and (b), together with component (c), component (d) and component (e), into a hopper and extruding under the desired conditions. Alternatively, component (c) and component (e) may be charged from a separate feeder. In this case, the neutralization reaction by above component (d) as the metal cation source with the carboxylic acids in components (a), (b) and (c) may be carried out by various types of extruders. The extruder may be either a single-screw extruder or a twin-screw extruder, although a twin-screw extruder is preferable. Alternatively, these extruders may be used in a tandem arrangement, such as single-screw extruder/twin-screw extruder or twin-screw extruder/twin-screw extruder. These extruders need not be of a special design; the use of existing extruders will suffice.

The golf ball material of the invention may be used as the material for a one-piece golf ball, or may be used as a cover material in a two-piece solid golf ball composed of a core and a cover encasing the core or in a multi-piece solid golf ball composed of a core of at least one layer and a cover of two or more layers—including an inner layer and an outer layer—which encases the core. In the case of a multilayer golf ball composed of a core of at least one layer and a cover of at least two layers in particular, it is advantageous to use the golf ball material of the invention as the inner cover layer and to use one, or a blend of two or more, selected from the group consisting of nonionic resins, ionic resins and thermoplastic polyurethanes as the outer cover layer.

The golf ball in which the golf ball material of the invention is used has a hardness, expressed as the ball deflection (mm) when subjected to a final load of 1,275 N (130 kgf) from an initial load of 98 N (10 kgf), which, although not subject to any particular limitation, is preferably at least 3.0 mm, and more preferably at least 3.1 mm, but preferably not more than 4.0 mm, and more preferably not more than 3.5 mm.

As described above, the golf ball material of the present invention is a highly neutralized resin mixture wherein two nonionic resins having weight-average molecular weights and molecular weight distribution breadths (weight-average molecular weight/number-average molecular weight) set within different specific ranges serve as the base resins, to which have been added an organic acid or a metal salt thereof, a neutralizing basic inorganic metal compound, and a specific amount of a spherical inorganic filler. Golf balls wherein an injection molding made from the inventive golf ball material is used in the cover or the like have an excellent rebound and durability. Moreover, the golf ball material of the invention has an excellent moldability.

EXAMPLES

The following Examples and Comparative Examples are provided by way of illustration and not by way of limitation.

Examples 1 to 3, Comparative Examples 1 to 5

Solid cores having a diameter of 37.50 mm and a weight of 32.80 g were obtained using a core material of the following formulation and composed primarily of cis-1,4-polybutadiene.

Core Formulation

| | |
|---|---|
| cis-1,4-Polybutadiene | 100 parts by weight |
| Zinc oxide | 5.0 parts by weight |
| Barium sulfate | 26.0 parts by weight |
| Antioxidant | 0.1 part by weight |
| Zinc acrylate | 23.0 parts by weight |
| Crosslinking agent (organic peroxide) | 1.2 parts by weight |

Next, in each example, an inner cover layer material of the composition shown in Table 1 was mixed in a kneading-type twin-screw extruder at 200° C. to give an inner cover layer material in the form of pellets. The pelletized material was then injected into a mold in which the above solid core had been placed, thereby producing a sphere having an inner cover layer with a thickness of 1.5 mm.

Next, the "ionic resin blend material" shown below was injection-molded as the outer cover layer material, thereby producing a three-piece solid golf ball having the diameter and weight indicated in Table 1.

Ionic Resin Blend Material

A cover composition prepared by blending the resins having the trade names Himilan 1605 and Himilan 1706 in a weight ratio of 50:50.

The properties of the golf balls obtained in the respective examples of the invention and comparative examples were evaluated as described below. The results are presented in Table 1.

TABLE 1

| | | Example | | | Comparative Example | | | | |
|---|---|---|---|---|---|---|---|---|---|
| | | 1 | 2 | 3 | 1 | 2 | 3 | 4 | 5 |
| Inner cover Layer | MAA based nonionic resin (1) | 50 | 50 | 50 | 50 | 50 | 100 | — | — |
| | MAA based nonionic resin (2) | 50 | 50 | 50 | 50 | 50 | — | 100 | — |

TABLE 1-continued

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
|  | MAA-based ionic resin (3) | — | — | — | — | — | — | — | 50 |
|  | MAA-based ionic resin (4) | — | — | — | — | — | — | — | 50 |
|  | Magnesium stearate | 70 | 70 | 70 | 70 | 70 | 70 | 70 | — |
|  | Magnesium oxide | 2.0 | 2.0 | 2.0 | 2.0 | 2.0 | 1.0 | 3.0 | — |
|  | Spherical inorganic filler A | 5 | 10 | — | — | 25 | — | — | — |
|  | Spherical inorganic filler B | — | — | 5 | — | — | — | — | — |
| Outer cover Layer | Ionic resin blend material | Same for both Examples and Comparative Examples | | | | | | | |
| Resin properties of inner cover layer | Melt index (g/10 min) | 3.2 | 2.7 | 3.0 | 3.0 | 3.0 | 2.5 | 4.1 | 4.0 |
|  | Degree of neutralization (%) | 80 | 80 | 80 | 80 | 80 | 90 | 80 | 80 |
|  | Shore D hardness | 58 | 59 | 58 | 57 | 60 | 53 | 62 | 55 |
| Ball properties | Diameter (mm) | 42.72 | 42.70 | 42.71 | 42.70 | 42.70 | 42.68 | 42.67 | 42.66 |
|  | Weight (g) | 45.54 | 45.54 | 45.53 | 45.53 | 45.55 | 45.51 | 45.53 | 45.52 |
|  | 10-130 kgf Deflection (mm) | 3.17 | 3.14 | 3.16 | 3.19 | 3.13 | 3.21 | 3.17 | 3.23 |
|  | Initial velocity (m/s) | 77.26 | 77.31 | 77.27 | 77.22 | 77.30 | 77.07 | 77.27 | 76.84 |
|  | Durability (shots) | 214 | 222 | 210 | 187 | 93 | 196 | 166 | 161 |

Ingredient amounts shown above are in parts by weight.

The materials in the above table are explained below.
MAA-Based Nonionic Resin (1)

An ethylene-methacrylic acid-isobutylene acrylate ternary copolymer available from DuPont-Mitsui Polychemicals Co., Ltd. under the trade name Nucrel N035C. Acid content, 10 wt %; Mw, 155,000; Mw/Mn, 5.76.
MAA-Based Nonionic Resin (2)

An ethylene-methacrylic acid binary copolymer available from DuPont-Mitsui Polychemicals Co., Ltd. under the trade name Nucrel N2060. Acid content, 20 wt %; Mw, 73,400; Mw/Mn, 3.12.
MAA-Based Ionic Resin (3)

A magnesium ionomer of an ethylene-methacrylic acid-isobutylene acrylate ternary copolymer, available from E.I. DuPont de Nemours & Co. under the trade name Surlyn 6320. Acid content, 9.6 wt %; Mw, 181,000; Mw/Mn, 4.98.
MAA-Based Ionic Resin (4)

A sodium ionomer of an ethylene-methacrylic acid binary copolymer, available from DuPont-Mitsui Polychemicals Co., Ltd. under the trade name Himilan AM7318. Acid content, 18 wt %; Mw, 104,000; Mw/Mn, 4.65.

The molecular weights and molecular weight distributions of each of the above polymers were determined by measurement using gel permeation chromatography (GPC), followed by calculation of the polystyrene-equivalent values.
Magnesium Stearate Available under the trade name Magnesium Stearate G from NOF Corporation.

The spherical inorganic fillers are shown in the following table.

TABLE 2

|  | Manufacturer | Product name | Type of glass | Average particle size |
| --- | --- | --- | --- | --- |
| A | Unitika | Unibeads UB-02E | aluminum borosilicate | 20 μm |
| B | Unitika | Unibeads UB-02L | soda-lime | 20 μm |

*Aluminum borosilicate: $Al_2O_3$—$B_2O_3$—$SiO_2$ glass
*Soda-lime: NaO—CaO—$SiO_2$ glass "Soda-lime" refers to a soda-lime glass obtained by mixing together and fusing silica ($SiO_2$), sodium carbonate ($Na_2CO_3$) and calcium carbonate ($CaCO_3$).

The physical properties of the golf ball materials and the golf balls were measured as follows.
Melt Index (g/10 min)

The measured value obtained in accordance with JIS-K 7210 at a test temperature of 190° C. and under a test load of 21.18 N (2.16 kgf).
Shore D Hardness of Material The composition was molded into sheets having a thickness of 2 mm, three such sheets were stacked together, and the hardness was measured with a Shore D durometer.
Deflection (mm)

The golf ball was placed on a steel plate and the deflection (mm) by the ball when compressed under a final load of 1,275 N (130 kgf) from an initial load of 98 N (10 kgf) was measured. This test was carried out at 23±1° C.
Initial Velocity (m/s)

The initial velocity of the ball was measured using an initial velocity measuring apparatus of the same type as the USGA drum rotation-type initial velocity instrument approved by the R&A. The ball was held isothermally at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit twice. The time taken by the ball to traverse a distance of 6.28 ft (1.91 m) was measured and used to compute the initial velocity of the ball. This cycle was carried out over a period of about 15 minutes.
Durability to Cracking The durability of the golf ball was evaluated using an ADC Ball COR Durability Tester produced by Automated Design Corporation (U.S.). The ball was fired pneumatically and made to repeatedly strike two metal plates arranged in parallel. Using the average number of shots required for the ball to crack, the durability was rated according to the criteria indicated below. (Average values were obtained by furnishing four balls of the same type for testing, repeatedly firing each of the four balls until it cracked, and averaging the number of shots required for the respective balls to crack. The type of tester used was a vertical COR durability tester, and the incident velocity of the balls on the metal plates was 43 m/s.)

As is apparent from the results in Table 1 above, the golf balls obtained in Comparative Examples 1 to 5 had the following drawbacks.

In Comparative Example 1, spherical inorganic filler was not added. The basic properties were comparable, but the durability decreased.

In Comparative Example 2, too much spherical inorganic filler was added. The ball rebound increased, but the durability declined dramatically.

In Comparative Example 3, a nonionic resin having an acid content of 15 wt % or less was used alone as the base resin. Although the ball hardness softened and the durability was good, compared with the examples of the invention, the rebound decreased.

In Comparative Example 4, a nonionic resin having an acid content of at least 16 wt % was used alone as the base resin. Although the ball rebound improved, the hardness remained high and the durability decreased.

In Comparative Example 5, an ionic resin having an acid content of at least 16 wt % and an ionic resin having an acid content of 15 wt % or less were used as the base resins. Although it was possible to soften the ball hardness compared with the examples of the invention, the rebound decreased. In addition, the durability also decreased somewhat.

The invention claimed is:

1. A golf ball material which is a resin mixture comprising:
    a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 2.5 to 10.0 and an unsaturated carboxylic acid content of at least 16 wt %,
    a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of 15 wt % or less,
    an organic acid or a metal salt thereof,
    a basic inorganic metal compound for neutralizing at least 70 mol % of acid groups in components (a) to (c), and
    a spherical inorganic filler;
    wherein the resin mixture has a Shore D hardness of from 40 to 60, has a mixing ratio by weight (a):(b) between component (a) and component (b) of from 20:80 to 80:20, includes component (c) in an amount of from 30 to 80 parts by weight per 100 parts by weight of components (a) and (b) combined, and includes component (e) in an amount of from 0.01 to 20 parts by weight per 100 parts by weight of components (a) and (b) combined.

2. The golf ball material of claim 1, wherein component (e) includes silicon dioxide.

3. The golf ball material of claim 1, wherein the spherical inorganic filler (e) has a sphericity (ratio of maximum particle length/minimum particle width) of from 1.00 to 2.00.

4. The golf ball material of claim 1, wherein the spherical inorganic filler (e) is composed of a glass material.

5. The golf ball material of claim 4, wherein the glass material is selected from the group consisting of $NaO-CaO-SiO_2$ glasses, $Al_2O_3-B_2O_3-SiO_2$ glasses and $CaO-Al_2O_3-SiO_2$ glasses.

6. The golf ball material of claim 5, wherein the glass material has the following oxide equivalent composition:
    when a $NaO-CaO-SiO_2$ glass is used, the oxide equivalent composition is 0.5 to 45 wt % of NaO, 0.5 to 45 wt % of CaO, and 40 to 90 wt % of $SiO_2$;
    when an $Al_2O_3-B_2O_3-SiO_2$ glass is used, the oxide equivalent composition is 0.5 to 40 wt % of $Al_2O_3$, 0.5 to 40 wt % of $B_2O_3$, and 40 to 90 wt % of $SiO_2$;
    when a $CaO-Al_2O_3-SiO_2$ glass is used, the oxide equivalent composition is 0.5 to 45 wt % of CaO, 0.5 to 40 wt % of $Al_2O_3$, and 40 to 90 wt % of $SiO_2$.

7. The golf ball material of claim 1, wherein the spherical inorganic filler (e) has an average particle size of from 0.1 to 1,0001 μm.

8. The golf ball material of claim 1, wherein the organic acid of component (c) is stearic acid or a metal salt thereof.

9. The golf ball material of claim 1, wherein the unsaturated carboxylic acid included in components (a) and (b) is acrylic acid or methacrylic acid.

10. A method of preparing a golf ball material, comprising the step of preparing the golf ball material of claim 1 using a single-screw extruder, a twin-screw extruder, or a tandem extruder thereof.

* * * * *